United States Patent [19]
Burstein et al.

[11] 3,779,710
[45] Dec. 18, 1973

[54] AIR CLEANING APPARATUS

[75] Inventors: Norman Burstein, Cherry Hill; Richard C. Ditzler, Cinnaminson, both of N.J.

[73] Assignee: Smokontrol Corporation of America, Cinnaminson, N.J.

[22] Filed: Mar. 22, 1971

[21] Appl. No.: 126,497

[52] U.S. Cl. ............. 23/288 F, 23/288 J, 219/393, 219/411, 219/553
[51] Int. Cl. ...................... B01d 53/00, F04b 37/00
[58] Field of Search...................... 23/288 F, 288 J, 23/288 K; 219/393, 411, 412, 354, 553, 396–400

[56] References Cited
UNITED STATES PATENTS

| | | | |
|---|---|---|---|
| 3,470,354 | 9/1969 | Tilus | 219/393 |
| 2,846,557 | 8/1958 | Schulze et al. | 219/393 X |
| 3,513,294 | 5/1970 | Goolkasian | 219/393 |
| 3,461,275 | 8/1969 | Poole | 219/553 |
| 2,853,368 | 9/1958 | Odey | 23/288 F |
| 2,856,905 | 10/1958 | Bowen | 23/288 F UX |

*Primary Examiner*—Joseph Scovronek
*Attorney*—Morton C. Jacobs

[57] ABSTRACT

Apparatus for removing polluting vapors from air by high temperature oxidation of the vapors in the presence of a precious metal catalyst employs a source of radiant energy for heating the catalyst and pollutants. The energy source is insulated from the polluted air as it moves past the catalyst by a quartz glass which surrounds the source. The catalyst is applied to a cellular refractory block which forms passages for the air. Alternatively, the catalyst is applied to glass tubes that serve as the insulating shield for a plurality of spaced heaters, with the spaces between the glass tubes serving as passages for the polluted air.

4 Claims, 6 Drawing Figures

INVENTOR.
NORMAN BURSTEIN
RICHARD C. DITZLER

ATTORNEY

AIR CLEANING APPARATUS

BACKGROUND OF THE INVENTION

This invention relates to apparatus for removing polluting vapors from air by high temperature combustion in the presence of a precious metal catalyst.

One known form of apparatus for removing polluting vapors such as hydrocarbons from the air uses a block of ceramic material in a honeycomb or cellular form to provide a large number of small air passages whose walls are coated with a precious metal catalyst such as platinum. A heating chamber is used to heat the air before entering the catalyst coated passages to a sufficiently high temperature (e.g., several hundred degrees Fahrenheit) for the catalytic action. Where such apparatus is used for cleaning room air such as from a kitchen, a large volume of air must be heated. Known forms of catalytic combustion air cleaning apparatus are described in U. S. Pat. Nos. 2,715,671; 2,900,483; 3,290,483; 3,513,294, which apparatus includes arrangements for heating the catalyst by means of radiant energy. Where such a heating source is used, it is found that it tends to heat the air directly and to an unnecessarily high degree. That is, it has been found desirable to reduce the amount of heating of the air (which is ordinarily returned to the ambient, such as in a kitchen) and to apply the thermal energy to the catalyst where the combustion occurs, with the result of a lower temperature of the cleaned air. It has also been found that, where electrical heating wires are employed as the thermal energy source, high wattages are required to achieve the required operating temperatures where tha air is directly heated by the wires.

SUMMARY OF THE INVENTION

An object of this invention is to provide a new and improved apparatus for removing polluting vapors from air.

Another object is to provide a new and improved air cleaning apparatus employing a precious metal catalyst for high temperature combustion of polluting vapors employing a radiant energy heat source for the catalyst.

Another ojbect is to provide an improved air cleaning apparatus which is efficient in its heating and energy transfer.

Another object is to provide an improved air cleaning apparatus which is compact in construction and practical in cost.

Another object of the invention is to provide a new and improved air cleaning apparatus which is particularly suitable for cleaning the air in kitchens and about cooking apparatus.

In accordance with one form of the invention particularly suitable for use in restaurants and home kitchens, a catalytic oxidation system for combustion of pollutants such as hydrocarbons is provided for purifying the ambient air. A chimney structure is provided for directing the air past a precious metal catalyst where the combustion occurs. A radiant energy source for heating the catalyst is positioned nearby, and employs a resistance heater wire which is energized electrically. Quartz glass tubes enclose the heater wire and are substantially transparent to the infrared radiation for heating the catalyst and the pollutants in the passing air and are effective in insulating the heater wire from the passing air. Thereby, an efficient system is achieved for heating the catalyst at which the combustion of the polluting vapors takes place, without excessive heating of the air, and the heating elements are operated at a lower wattage than would be required were the heating elements directly exposed to the passing air.

In one form of the invention, a catalyst is applied to the walls of multi-cellular refractory blocks which are directly adjacent to rows of heating devices of the type described. In another form of the invention, the catalyst is directly applied to the glass insulating shield surrounding the heating wire, and with the spaces between these glass shields serving as circuitous passageways for the polluting air that impinges upon the catalytic coating.

BRIEF DESCRIPTION OF THE DRAWING

The foregoing and other objects of this invention, the various features thereof, as well as the invention itself, will be more fully understood from the following description, when read together with the accompanying drawing, in which.

In the drawing, corresponding parts are referenced throughout by similar numerals.

DESCRIPTION OF A PREFERRED EMBODIMENT

Figure 1:
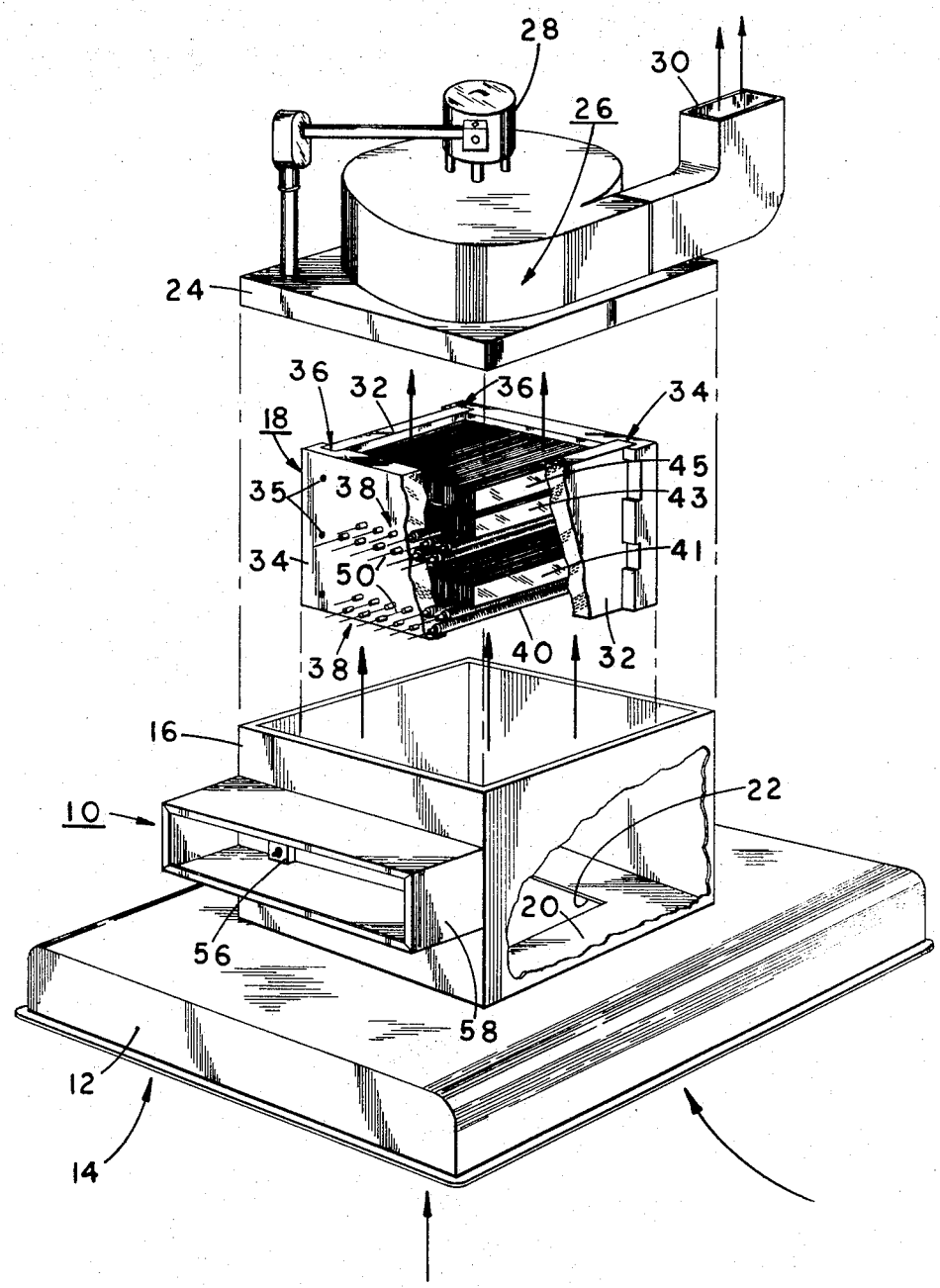
FIG. 1 is an exploded view in perspective of air cleaning apparatus embodying this invention.

In the air cleaning apparatus of FIG. 1, a casing 10 is formed of metal such as stainless steel or aluminum, and has a flared hood 12 or base which acts as an inlet and receives air to be cleaned, which flows in the direction of the arrow 14. The hood or base 12 may be mounted over cooking apparatus in a kitchen or other room in which the air contains various polluting vapors and solid material, such as hydrocarbons, which are to be removed.

Above the hood 12 is a metallic housing for a chimney 18, which encloses and supports air cleaning apparatus as a modular unit that can be readily removed for service and replacement. The chimney 18 sits in the housing 16 on a shoulder 20 formed on the top of the hood 12, which contains a rectangular opening 22 that forms an air passageway mating with the passageway of chimney 18. The cover 24 for the housing 16 carries an impeller 26 which is driven by an electric motor 28 to suck air up through the chimney unit 18 and out through the exhaust 30. Reference is made to applicants' copending application, Ser. No. 865,002, now abandoned, for further details of this and other construction features.

The chimney module 18 is formed of four rectangular wall blocks of asbestos 32, 34 in a generally cubed shape. The side-wall blocks 32 fit into grooves 36 in the front and rear wall blocks 34, and the blocks are secured together by suitable fastener 35. To complete the module assembly, two layers 38 of heater units 40 alternate with cellular blocks 41, 43 and 45 of refractory material of a known form, such as that described in U.S. Pat. No. 3,397,154. Each block has numerous internal air passages, the walls of which are coated with a precious metal catalyst, such as platinum or palladium. The air passages in the blocks may be of different types, such as at right angles to the planar top and bottom faces thereof, or at an intermediate angle such as 45° to direct the air against the passage walls coated with catalyst.

Each layer 38 and 39 of the heater units 40 is formed as two rows of spaced heaters, with heaters in one row being located between the heaters of the adjacent row, so that the radiant energy from the heaters of one row tends to pass through the space between the heaters of the adjacent row.

Figure 3:
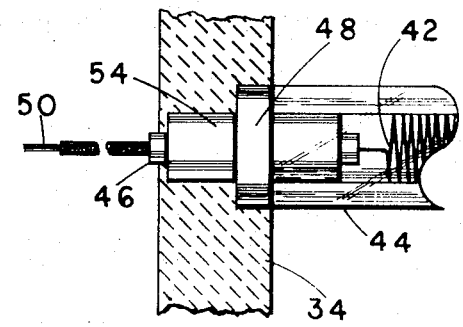
FIG. 3 is a sectional view of the mounting of the heating device of FIG. 2.
Figure 4:
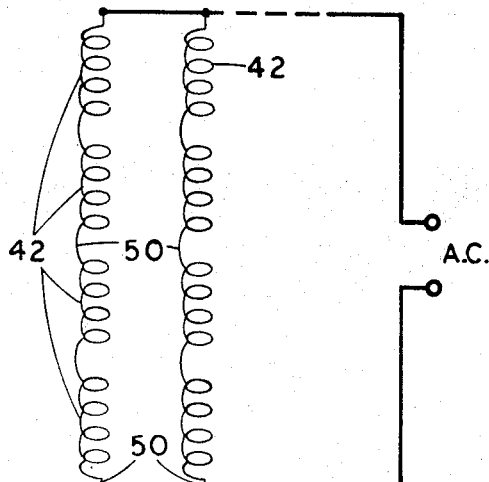
FIG. 4 is a schematic circuit diagram of the connections of the heating wires of FIG. 1.

Each heater unit 40 is formed of a coil of high resistance wire 42 (FIG. 2) such as Nichrome or kanthol, suitable to operate at temperatures of 1,600° to 1,800° F. Each heater coil is surrounded by an insulating shield 44 which is fabricated of a non-metallic material such as glass suitable to pass the infrared or thermal radiation from the resistance wire functioning as a radiant heater source at the indicated temperatures. One form of glass that is suitable is a 96 percent silica glass, an example of which is available under the trade name Vycor. Each end of the resistance wire 42 is crimped to a stainless steel tube 46 which passes through a porcelain insulator 48 and has its other end crimped to a teflon coated lead wire 50. The porcelain insulator has a central enlarged disc 51 which closes the mouth of the cylindrical shield 44, into which is inserted a reduced shoulder portion 52 of the insulator. The central portion 51 of each insulator and a reduced shoulder 54 thereof on the opposite side are both mounted within corresponding openings formed in one of the asbestos walls 34 (FIG. 3). In this way, each heater wire 42 is effectively suspended across the chimney module formed by the asbestos walls and the air passes through the spaced heaters. The glass shield 44 completely surrounds the heater wire extending across the passageway and insulates that wire from the moving air stream. The heater wires may be connected in any suitable configuration of series-parallel relationship for energization by a suitable current source (e.g., a 200-volt a-c source has been found suitable for energizing an assembly of 24 heater wires arranged in six parallel combinations, each combination containing four series heater wires as shown in FIG. 4). A circuit-breaker switch 56 in a in a front control box 58 controls the energization of the heaters.

In operation, the motor driven impeller 26 draws a substantial volume of air into the inlet of hood 12, up through the chimney unit 18, and out through the exhaust 30. The air is drawn through the catalyst coated passages in the refractory blocks 41, 43 and 45, which are at high temperatures of several hundred degrees Fahrenheit due to the heating from the heater units 40. Pollutants in the air such as hydrocarbons are oxidized at the hot catalytic surface and the air is thereby effectively cleaned and suitable for return to the ambient.

When the hood 12 lies over cooking or other air polluting equipment, especially where the latter is open to the ambient, a large volume of air must be moved by the impeller 26. This is necessary in order to produce a pressure gradient into the hood and catalytic unit 18, so that effectively all the polluted air is processed, and none of it bypasses the hood 12 and spills over into the ambient. As this large volume of air moves past the heater tubes and through the cellular passages of the blocks 41, 43 and 45, the polluting vapors and solid materials carried by the air are effectively heated by the radiant energy from the heater wires 42 passed by the glass shields 44. In addition, the radiant energy passes into the cellular passages of the refractory blocks and heats the metal coating on the passage walls to the desired temperature. However, the air itself does not touch the heater wires, though it is heated to a much lesser degree by contact with the moderately hot glass shields 44.

Consequently, the combustion of the pollutants in the air is relatively efficient, with the heat therefor being supplied by the radiant thermal energy passed through the glass shields 44 while the large volume of air is not heated to the same extent. Therefore, the air drawn out into the ambient by the exhaust 30 is at a lower temperature than would be the case if it were directly heated by direct contact with or by convection currents produced by the wires. In addition, the electricity required to maintain the heated wires at a suitable temperature (e.g., 1,600 to 1,800° F.) for infrared emission is also substantially less. For example, in one system involving the movement of air at about 180 to 225 cubic feet per minute, 6 kilowatts of electric energy were sufficient for operating the heater tubes in the unit of the type indicated in FIG. 1, in which glass shields 44 enclose the heater wires and in which the catalyst coated passage walls are maintained at termperatures of about 450° F. and above. Thus, a 30 amp, 200 volt a-c power supply, which is often available without special requirements, can be used. However, where the shields 44 were not used, so that the heater coils 42 were open to the air (or where metal sheathed heaters were used), a very much larger energization of about 18 to 22 kilowatts was required.

It has also been found that under certain circumstances the air passages in the refractory blocks 41 and 43 may become clogged (e.g., due to a large quantity of grease or other pollutant in the air). The air flow is thereby substantially reduced and its cooling effect on the open heater wires is diminished. Consequently, overheating may result and lead to fires, burn-out of the heater wires, and other damaging conditions.

Thus, the use of a radiant energy source such as the glass shielded heater tubes has been found to be effective as a line-of-sight heater for the catalyst coated walls of blocks 41 and 43, and for the pollutants carried by the air, but with a substantial economy in the cost of electric power that is required. The glass shields 44 filter out radiant energy in the region of the ultra-violet, and thereby tend to heat up and serve as a suitable heat transfer device for the moving air.

Figure 5:
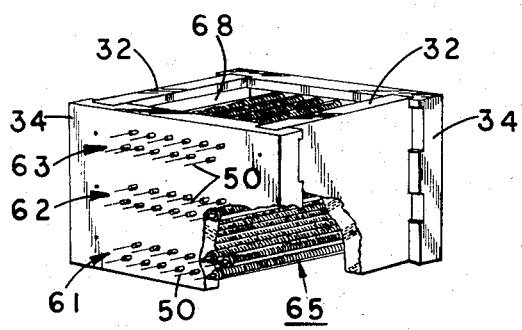
FIG. 5 is a perspective view of a modification of the apparatus of FIG. 1.

A modified form of the invention is shown in FIG. 5, in which a chimney module is formed in a fashion similar to that shown in FIG. 1 in its use of asbestos blocks 32 and 34 interlocked and fastened together in the manner described above. In the embodiment of FIG. 5, three layers 61, 62 and 63 of heater devices 65 are formed, each layer having two staggered rows, and these devices 65 are assembled between the front and rear walls 34 of the unit 60 in a manner similar to that described above.

Figure 2:
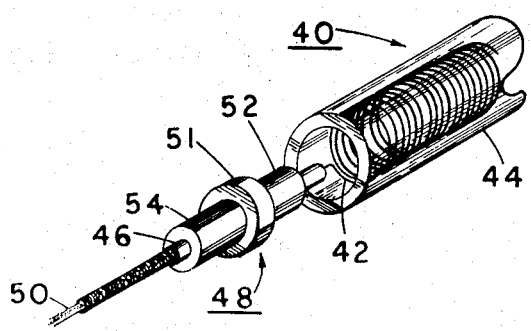
FIG. 2 is an exploded view in perspective of a portion of an electric heating device used in the apparatus of FIG. 1.
Figure 6:
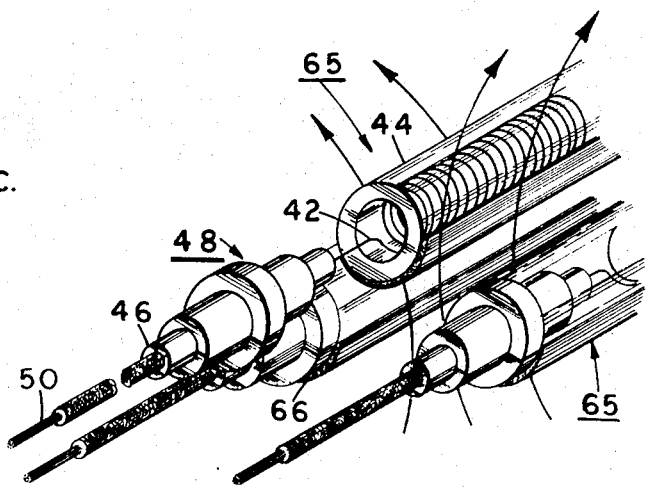
FIG. 6 is an exploded view in perspective of a portion of the apparatus of FIG. 5.

As shown in the enlarged perspective view of FIG. 6 (where parts corresponding to those previously described are referenced by the same numerals), the heater element 42 and glass shield 44 therefor are constructed in the same fashion as that shown in FIG. 2, except that each glass shield 44 is coated for about half of its periphery with a layer 66 of precious metal such as platinum or palladium. In addition, the inside walls 68 of the asbestos blocks 32 and 34 may likewise be coated with a layer of precious metal catalyst. The coating process preferably takes the form of a vapor deposition 66 of the metal directly on the glass shields 44, whereby a relatively thin layer is achieved of thickness sufficient for the catalytic action.

The catalytic operation of the form of FIGS. 5 and 6 is similar to that described above. The space between each adjacent heater and catalyst unit 65 serves as a circuitous passage for the air as it moves up through the module 60. In addition, between each of the layers 61, 62, 63 of heaters is a somewhat larger space (as may be seen from the space between the layers of heater lead wires 50 along the front wall 34). It is found that the air becomes turbulent as it rises up and expands into these larger spaces, which action prevents the formation of well-formed air patterns and tends to ensure that the air impinges on the catalytic coatings 66 of the next layer above.

The catalytic coatings 66 could be formed around the entire cylindrical periphery of each shield 44. However, it is found that by omitting the coating on the upper portion, there is an effective radiant heating action of each catalytic layer 66 from the heater units 65 in the row below as well as from the heater wire inside the associated shield 44. The saving on precious metal is also substantial, and the resulting operation is almost as effective since the flow of air is largely against the coated portion of the shield.

Thus, new and improved air cleaning apparatus is provided by this invention. Other modifications of the invention and a variety of applications thereof may be apparent from the above description, which is presented as illustrative and not as limiting.

We claim:

1. In apparatus for elimination of vapors from air comprising:
   a precious metal catalyst;
   means spaced from said catalyst for heating said catalyst to a temperature for oxidation of the vapors;
   and passageway means for directing air for movement past said catalyst;
   the improvement of:
   said heating means including a heating device having a plurality of electrical heating wires across said passageway means for supplying infrared radiant energy, and means located between said heating wires and said catalyst for insulating said heating element from said moving air and for passing said radiant energy to said catalyst, said insulating means comprising a plurality of quartz glass tubes completely enclosing said heating wires and transparent to the infrared radiation from said wires, said catalyst covering parts of the outer surfaces of said tubes;
   said heating wires being formed in a plurality of rows with the wires in one row being located between the wires in an adjacent row; and said glass members having said catalyst covering part of the outer surface thereof and having part of said outer surface uncovered, so that the catalyst on some of said tubular members is heated by radiation from said wires within the associated tubular members and by radiation from wires within others of said tubular members.

2. Apparatus as recited in claim 1 wherein said air directing means further includes a multi-passage member extending across said passageway with the passage receiving radiation from said wires;
   and said catalyst is attached to the passage walls of said member.

3. Apparatus as recited in claim 1 wherein said quartz glass tubes are formed of 96 percent silica glass.

4. Apparatus for eliminating smoke and vapors from air comprising:
   means forming passages for movement of air therethrough;
   a precious metal catalyst in said passages and in the path of the moving air,
   and a source of thermal radiation including a plurality of parallel electrical heater wires;
   said passages forming means including means located between said catalyst and said source for passing said radiation to said catalyst and for insulating said source from the air moving in said passages including a plurality of spaced quartz tubes each surrounding a different one of said wires and spaced to form air passages therebetween, said catalyst being attached to outer surfaces of said tubes, and said passage forming means further including a multi-passage refractory block, said catalyst being attached to the passage walls of said block, and means for directing the moving air past said insulating means so that pollutants carried by the air receive radiant energy from said source to be heated thereby.

* * * * *